(12) United States Patent
Zheng et al.

(10) Patent No.: US 12,136,235 B2
(45) Date of Patent: Nov. 5, 2024

(54) HUMAN MODEL RECOVERY USING DEEP LEARNING TECHNIQUES

(71) Applicant: Shanghai United Imaging Intelligence Co., Ltd., Shanghai (CN)

(72) Inventors: Meng Zheng, Cambridge, MA (US); Srikrishna Karanam, Bangalore (IN); Ziyan Wu, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 376 days.

(21) Appl. No.: 17/559,364

(22) Filed: Dec. 22, 2021

(65) Prior Publication Data

US 2023/0196617 A1 Jun. 22, 2023

(51) Int. Cl.
*G06T 7/73* (2017.01)
*G06N 3/045* (2023.01)
(Continued)

(52) U.S. Cl.
CPC .............. *G06T 7/75* (2017.01); *G06N 3/045* (2023.01); *G06T 7/50* (2017.01); *G06V 40/10* (2022.01);
(Continued)

(58) Field of Classification Search
None
See application file for complete search history.

(56) References Cited

U.S. PATENT DOCUMENTS

| 9,433,387 | B2 | 9/2016 | Ahn | |
|---|---|---|---|---|
| 2013/0050185 | A1* | 2/2013 | Xie | G06T 7/50 345/419 |

(Continued)

FOREIGN PATENT DOCUMENTS

| CN | 105451603 B | 3/2016 |
|---|---|---|
| CN | 107358576 A | 11/2017 |

(Continued)

OTHER PUBLICATIONS

Y. Xu, S. -C. Zhu and T. Tung, "DenseRaC: Joint 3D Pose and Shape Estimation by Dense Render- and-Compare," 2019 IEEE/CVF International Conference on Computer Vision (ICCV), Seoul, Korea (South), 2019, pp. 7759-7769, doi: 10.1109/ICCV.2019.00785. (Year: 2019).*

*Primary Examiner* — Jiangeng Sun
(74) *Attorney, Agent, or Firm* — Zhong Law, LLC (57) ABSTRACT

Human model recovery may be realized utilizing pre-trained artificially neural networks. A first neural network may be trained to determine body keypoints of a person based on image(s) of a person. A second neural network may be trained to predict pose parameters associated with the person based on the body keypoints. A third neural network may be trained to predict shape parameters associated with the person based on depth image(s) of the person. A 3D human model may then be generated based on the pose and shape parameters respectively predicted by the second and third neural networks. The training of the second neural network may be conducted using synthetically generated body keypoints and the training of the third neural network may be conducted using normal maps. The pose and shape parameters predicted by the second and third neural networks may be further optimized through an iterative optimization process.

16 Claims, 7 Drawing Sheets

(51) Int. Cl.
  *G06T 7/50* (2017.01)
  *G06V 40/10* (2022.01)
(52) U.S. Cl.
  CPC .............. *G06T 2207/20081* (2013.01); *G06T 2207/20084* (2013.01)

(56) References Cited

U.S. PATENT DOCUMENTS

2020/0184668 A1\* 6/2020 Rad .................. G06F 30/00
2022/0198753 A1\* 6/2022 Sawhney ............... G06T 7/73

FOREIGN PATENT DOCUMENTS

CN  109064399 A      12/2018
KR  20210058320 A1 \*  5/2021

\* cited by examiner

HUMAN MODEL RECOVERY USING DEEP LEARNING TECHNIQUES

BACKGROUND

A human model such as a three-dimensional (3D) human model (e.g., mesh) of a patient's body, that realistically reflects the individual patient's shape and pose, may be used in a variety of medical applications including patient positioning, surgical navigation, unified medical record analysis, etc. For example, with radiation therapy and medical imaging, success often hinges upon the ability to place and maintain a patient in a desirable position so that the treatment or scan can be performed in a precise and accurate manner. Having real time knowledge about an individual patient's physical characteristics, such as the patient's body shape and pose, in these situations may bring benefits including, for example, faster and more accurate positioning of the patient in accordance with a scan or treatment protocol, more consistent results, etc. In other example situations, such as during a surgical procedure, information about an individual patient's physique may offer insight and guidance for both treatment planning and execution. The information may be utilized, for instance, to locate and navigate around a treatment site of the patient. When visually presented in real time, the information may also allow the state of the patient to be monitored during the procedure.

Existing deep learning based techniques for human model recovery (HMR) require annotated 3D training data, which are very difficult, if not impossible, to obtain. The results produced by these techniques also lack accuracy, especially when parts of the target human body are covered, blocked, or otherwise invisible. Therefore, it is highly desirable for 3D HMR systems and methods to have the ability to accurately recover a 3D human model despite not having 3D annotations and even if the target human body is not entirely visible.

SUMMARY

Described herein are systems, methods and instrumentalities associated with recovering a three-dimensional (3D) human model based on one or more images (e.g., two-dimensional (2D) images) of a person. The systems, methods and/or instrumentalities may utilize one or more processors that may be configured to determine, using a first neural network, body keypoints of the person based on at least a first image (e.g., a color image) of the person, determine, using a second neural network, at least a first plurality of parameters associated with a pose of the person based on the body keypoints of the person determined by the first neural network, and generate, based on at least the first plurality of parameters, a three-dimensional (3D) human model that represents at least the pose of the person. The second neural network may be trained through a training process that comprises providing a first set of body keypoints (e.g., synthetically generated body keypoints) to the second neural network, causing the second neural network to predict pose parameters based on the first set of body keypoints, generating a preliminary 3D human model based on at least the pose parameters predicted by the second neural network, inferring a second set of body keypoints from the preliminary 3D human model, and adjusting operating parameters of the second neural network based on a difference between the first set of body keypoints and the second set of body keypoints.

In examples, the systems, methods and/or instrumentalities described herein may also utilize the one or more processors to determine, using a third neural network, a second plurality of parameters associated with a shape of the person based on at least a second image (e.g., a depth image) of the person. The one or more processors may then generate the 3D human model described above based on the first plurality of parameters determined by the second neural network and the second plurality of parameters determined by the third neural network, wherein the 3D human model may further represent the shape of the person.

In examples, the one or more processors may be configured to determine a normal map based on the second image and determine the second plurality of parameters based on the normal map. The second neural network and the third neural network may be trained (e.g., together) through a training process that comprises causing the second neural network to predict pose parameters associated with a human body based on a first set of body keypoints associated with the human body, causing the third neural network to predict shape parameters associated with the human body based on a depth image of the human body (e.g., based on a first normal map that may be derived from the depth image), and generating a preliminary 3D human model based on the pose parameters predicted by the second neural network and the shape parameters predicted by the third neural network. The training process may further include inferring a second set of body keypoints and a second normal map based on at least the preliminary 3D human model, adjusting operating parameters of the second neural network based on a difference between the first set of body keypoints and the second set of body keypoints, and adjusting operating parameters of the third neural network based on a difference between the first normal map and the second normal map.

In examples, the systems, methods and/or instrumentalities described herein may also utilize the one or more processors to, subsequent to generating the 3D human model based on the first plurality of parameters and the second plurality of parameters, optimize the 3D human model by at least inferring a second set of body keypoints and a second normal map from the 3D human model, adjusting the first plurality of parameters based on a difference between the second set of body keypoints and the body keypoints determined by the first neural network, adjusting the second plurality of parameters based on a difference between the second normal map and the normal map determined based on the second image, and adjusting the 3D human model based on the adjusted first plurality of parameters and the adjusted second plurality of parameters.

In examples, an apparatus configured to perform the tasks described herein may include a first sensing device configured to capture the first image of the person and a second sensing device configured to capture the second image of the person.

BRIEF DESCRIPTION OF THE DRAWINGS

A more detailed understanding of the examples disclosed herein may be had from the following description, given by way of example in conjunction with the accompanying drawings.

DETAILED DESCRIPTION

The present disclosure is illustrated by way of example, and not by way of limitation, in the figures of the accompanying drawings.

Figure 1:
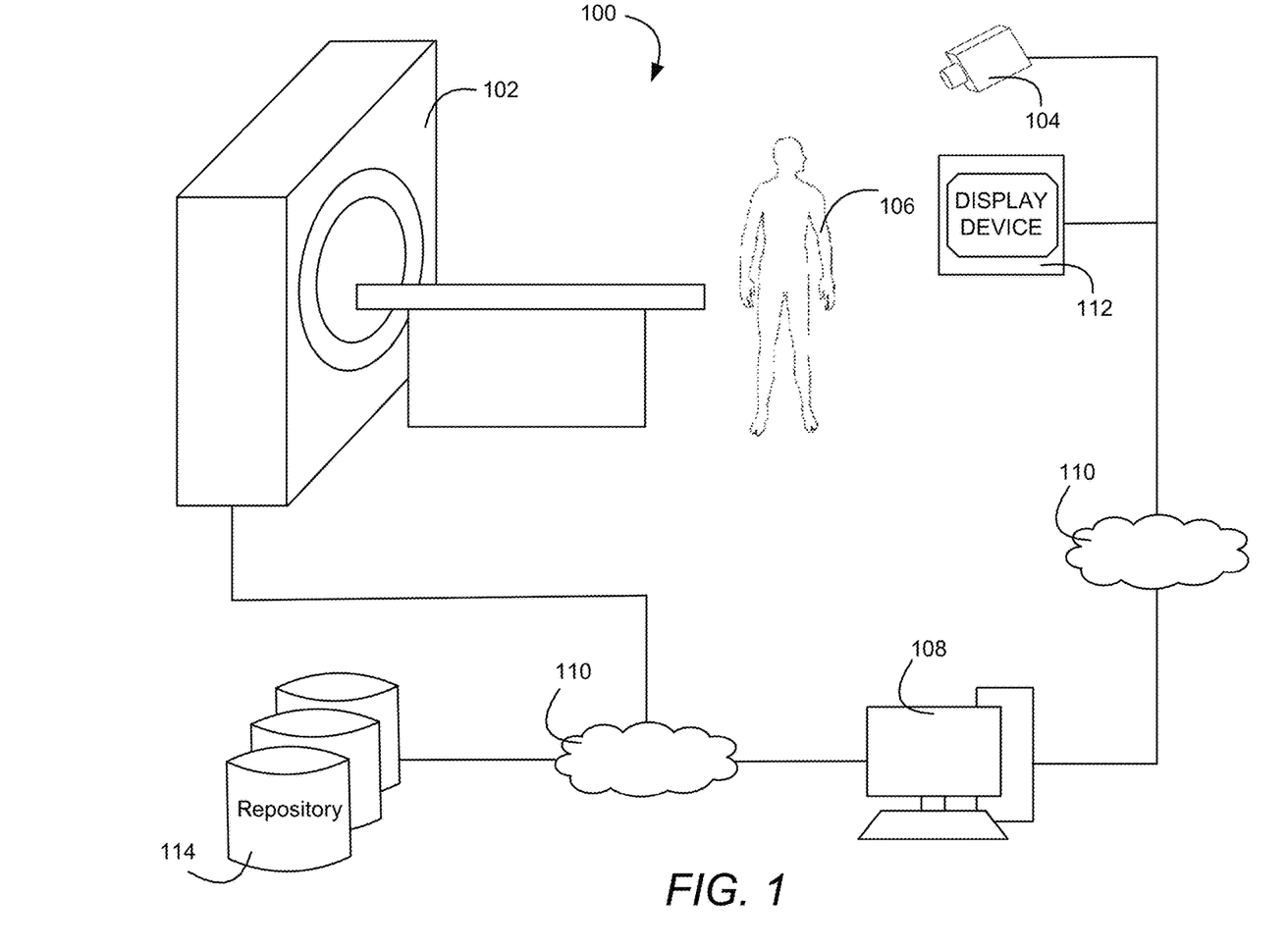
FIG. 1 is a diagram illustrating an example system that may utilize the methods and instrumentalities disclosed herein to generate a 3D human model.

FIG. 1 shows a diagram illustrating an example system 100 that may utilize the methods and instrumentalities disclosed herein to generate a human model such as a 3D human model (e.g., a 3D mesh).

As shown in the figure, the system 100 may be configured to perform a medical scan or imaging procedure using a medical scanner 102 (e.g., a computer tomography (CT) scanner, a magnetic resonance imaging (MRI) machine, a positron emission tomography (PET) scanner, an X-ray machine, etc.), even though the system 100 may also be adapted to provide other types of healthcare services including, for example, radiation therapy, surgery, etc.

The system 100 may include one or more sensing devices 104 (e.g., image capturing devices) configured to capture images (e.g., 2D images) of a patient 106, for example, in front of the medical scanner 102, lying on a scan or treatment bed, etc. The sensing devices 104 may comprise one or more sensors including one or more cameras (e.g., digital color cameras), one or more red, green and blue (RGB) sensors, one or more depth sensors, one or more RGB plus depth (RGB-D) sensors, one or more thermal sensors such as infrared (FIR) or near-infrared (NIR) sensors, and/or the like. Depending on the type of sensors used, the images captured by the sensing devices 104 may include, for example, one or more pictures (e.g., one or more 2D color pictures of the patient 106) taken by a camera, one or more depth images generated by a depth sensor, etc. In example implementations, the sensing devices 104 may be installed or placed at various distinct locations of the system 100 and the sensing devices 104 may have different viewpoints (e.g., fields of view) towards the patient 106.

One or more of the sensing devices 104 may include respective processors configured to process the images of the patient 106 captured by the sensors described herein. Additionally, or alternatively, the system 100 may include a processing device 108 communicatively coupled to the sensing devices 104 and configured to process the images of the patient 106 captured by the sensing devices 104. The processing device 108 may be coupled to the sensing devices 104 (e.g., to the sensors comprised in the sensing device 104), for example, via a communication network 110, which may be a wired or wireless communication network. In response to receiving the images of the patient 106, the sensing devices 104 and/or the processing device 108 may analyze the images (e.g., at a pixel level) to determine various physical characteristics of the patient 106 (e.g., shape, pose, etc.). For example, in response to obtaining the images of patient 106, the sensing devices 104 and/or the processing device 108 may utilize one or more neural networks to generate (e.g., construct) a human model such as a 3D human model for patient 106 based on the images of the patient as described more fully below with respect to the accompanying figures. The human model may include a parametric model such as a skinned multi-person linear (SMPL) model that indicates the shape, pose, and/or other anatomical characteristics of the patient 106.

The human model generated by the sensing devices 104 and/or the processing device 108 may be used to facilitate a plurality of downstream medical applications and services including, for example, patient positioning, medical protocol design, unified or correlated diagnoses and treatments, patient monitoring, surgical navigation, etc. For example, the processing device 108 may determine, based on the 3D human model, whether the position and/or pose of the patient 106 meets the requirements of a predetermined protocol (e.g., while the patient 106 is standing in front of the medical scanner 102 or lying on a scan bed), and provide real-time confirmation or adjustment instructions (e.g., via display device 112), to help the patient 106 (or the medical scanner 102) get into the desired position and/or pose. As another example, the sensing device 104 and/or the processing device 108 may be coupled with a medical record repository 114 configured to store patient medical records including scan images of the patient 106 obtained through other imaging modalities (e.g., CT, MR, X-ray, SPECT, PET, etc.). The processing device 108 may analyze the medical records of patient 106 stored in the repository 114 using the 3D human model as a reference so as to obtain a comprehensive understanding of the patient's medical conditions. For instance, the processing device 108 may align scan images of the patient 106 from the repository 114 with the 3D human model to allow the scan images to be presented (e.g., via display device 112) and analyzed with reference to the anatomical characteristics (e.g., body shape and/or pose) of the patient 106 as indicated by the 3D human model.

Figure 2:
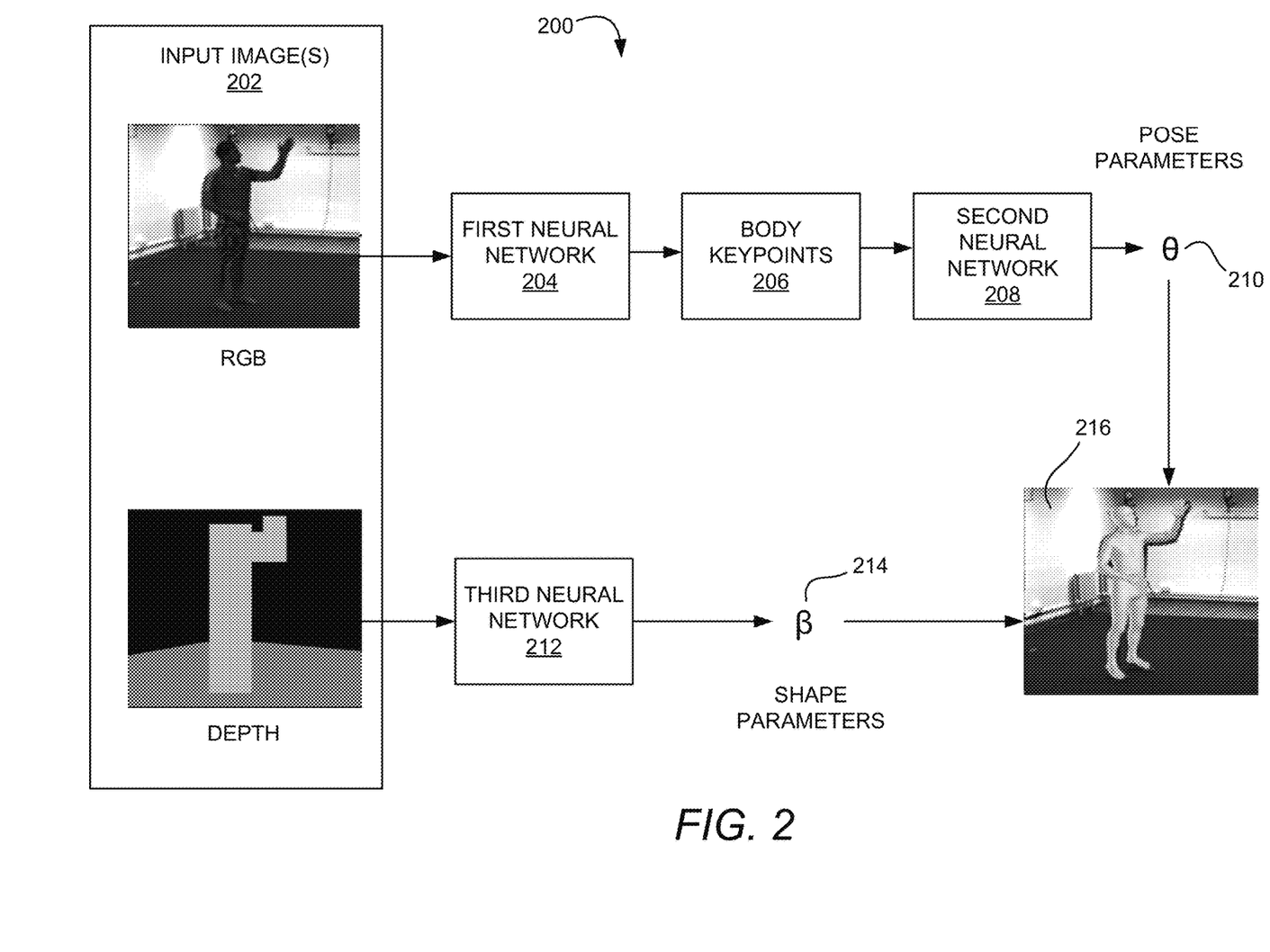
FIG. 2 is a diagram illustrating how a 3D human model may be recovered based on 2D image(s) of a person.

FIG. 2 shows a simplified block diagram 200 illustrating how a 3D human model 216 may be recovered based on one or more images (e.g., 2D image(s)) 202 of a person (e.g., patient 106 of FIG. 1).

The image(s) 202 may include, for example, a color image (e.g., an RGB image) and a depth image of the person (e.g., captured by respective sensing devices 104 shown in FIG. 1). As shown, based on an RGB image of the person, a plurality of body keypoints 206, may be extracted from the image, for example, using a first neural network 204 (e.g., a body keypoint extraction network). The extracted body keypoints 206 (e.g., in the form of one or more heat maps representing the body keypoints 206) may be provided to a second neural network 208 (e.g., a pose regression network), which may be configured to determine at least a plurality of pose parameters (e.g., $\theta$) 210 based on the extracted body keypoints 206. In examples, second neural network 208 may also be configured to determine a plurality of shape parameters (e.g., preliminary or baseline shape parameters, which are not shown in FIG. 2) based on the extracted body keypoints 206. When referred to herein, body keypoints may refer to body parts and/or joints that may indicate the pose and/or skeletal structure of a person. These body keypoints may include but may not be limited to, for example, a nose, a left eye, a right eye, a left ear, a right ear, a left shoulder, a right shoulder, a left elbow, a right elbow, a left wrist, a right wrist, a left hip, a right hip, a left knee, a right knee, a left ankle, a right ankle, etc.

Further as shown in FIG. 2, from a depth image (e.g., a depth map) of the person, a plurality of shape parameters (e.g., β) 214 may be determined based on depth information extracted from the depth image using a third neural network 212 (e.g., a shape regression network). The depth information may be extracted in the form of a normal map and may be provided to the third neural network 212 for determining the plurality of shape parameters β. When referred to herein, a normal map may include any form of representation that may indicate the direction perpendicular to the body surface of the person at each pixel of the depth image. For example, a normal map may be generated by determining a respective normal vector at each pixel location of the depth image by obtaining the height value associated with the pixel location from the depth image and calculating a vector tangent to the pixel location based on the derivative (e.g., partial derivative) or the rate of change in the height value at the pixel location in the X, Y, and Z directions. Once the plurality of pose parameters θ and the plurality of shape parameters β have been determined, 3D human model 216 may be generated based on the determined pose and shape parameters, for example, by determining multiple vertices (e.g., 6890 vertices based on 82 shape and pose parameters) associated with the individual person's body, connecting the vertices with edges to form polygons (e.g., such as a triangles), connecting multiple polygons to form a surface, using multiple surfaces to determine a 3D shape, and applying texture and/or shading to the surfaces and/or shapes.

First neural network 204, second neural network 208, and/or third neural network 212 may be implemented using one or more processors and one or more storage devices. The storage devices may be configured to store instructions that, when executed by the one or more processors, cause the one or more processors to implement the one or more neural networks (e.g., first neural network 204, second neural network 208, and/or third neural network 212). Each of the first, second, and third neural network may include a convolutional neural network (CNN) and/or a fully connected neural network (FNN). The one or more processors may include a central processing unit (CPU), a graphics processing unit (GPU), a microcontroller, a reduced instruction set computer (RISC) processor, an application specific integrated circuit (ASIC), an application-specific instruction-set processor (ASIP), a physics processing unit (PPU), a digital signal processor (DSP), a field programmable gate array (FPGA), or a combination thereof. The one or more storage devices may include volatile or non-volatile memory such as semiconductor memory (e.g., electrically programmable read-only memory (EPROM), electrically erasable programmable read-only memory (EEPROM), etc.), flash memory, a mass storage device (e.g., a magnetic disk such as an internal hard disk, a removable disk, a magneto-optical disk, a CD-ROM or DVD-ROM disk, etc.).

Each of first neural network 204, second neural network 208 and third neural network 212 may comprise multiple layers such as an input layer, one or more convolutional layers (e.g., followed by respective linear or non-linear activation functions), one or more pooling layers, and/or one or more fully connected layers. Each of the layers may correspond to a plurality of filters (e.g., kernels) designed to detect (e.g., learn) features from input images 202 that may represent the body pose and/or body shape of the person. The filters may be associated with respective weights that, when applied to an input, produce an output indicating whether certain visual features or patterns have been detected. The weights associated with the filters of the neural networks may be learned through respective training processes that will be described in greater detail below.

The deep-learning based techniques illustrated in FIG. 2 may provide many advantages over conventional human model recovery (HRM) systems and methods. For example, conventional HMR systems and methods may require training deep neural networks with 3D annotations, which may be very difficult and costly to obtain. In contrast, the techniques illustrated in FIG. 2 may divide an HRM task into multiple steps including, for example, using first neural network 204 to detect body keypoints of a person based on an image of the person and subsequently using second neural network 206 to infer at least pose parameters of the person based on the body keypoints detected by first neural network 204. As will be described in greater detail below, first neural network 204 may be trained using annotated 2D training data, which may be much easier and more efficient to obtain, and second neural network 208 may be trained using synthetically generated body keypoints, which may eliminate (e.g., substantially alleviate) the need for 3D annotations. Additionally, by using third neural network 212 to infer shape parameters based on a depth image of the person and constructing 3D human model 216 based on the shape parameters and the pose parameters obtained using the technique described herein, the accuracy of the human model may also be improved.

Figure 3:
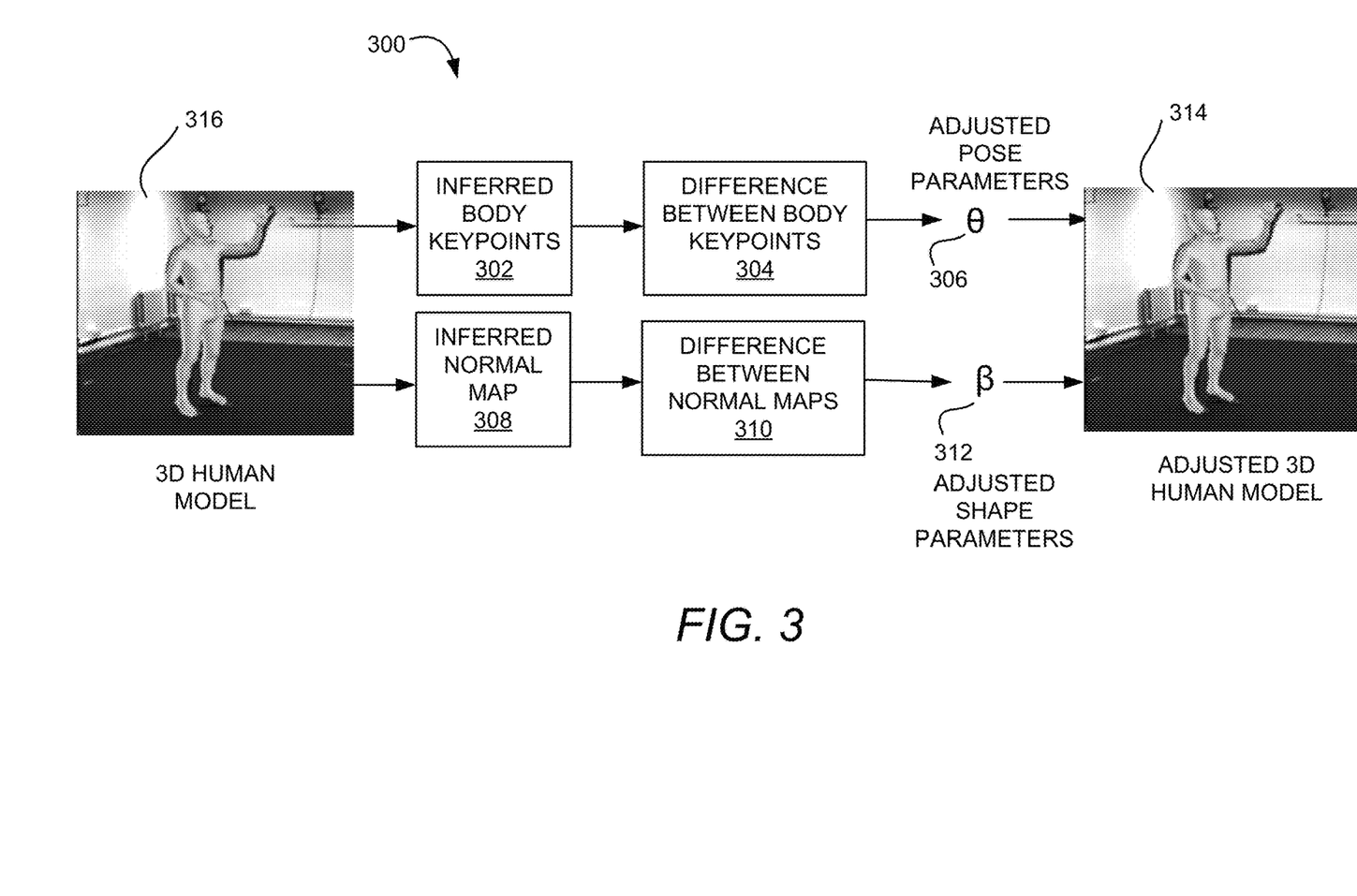
FIG. 3 is a diagram illustrating an example of an iterative process for making incremental improvements to a 3D human model.

In examples, the 3D human model generated using the techniques described above may be further optimized (e.g., by an optimization module) through an iterative process. The optimization may be performed because the pose parameters and the shape parameters used to constructed the 3D human model may be estimated using separate networks (e.g., second neural network 208 and third neural network 212 of FIG. 2) and, as such, the body keypoints and/or a body surface normal map determined based on the 3D human model may not be consistent (e.g., may not align) with the originally determined body key points (e.g., detected by first neural network 204 of FIG. 2) and/or the originally derived normal map (e.g., derived by third neural network 212 of FIG. 2). These inaccuracies and/or inconsistencies may be corrected by adjusting the pose and shape parameters associated with the 3D human model iteratively, for example, after the neural networks have been trained and/or deployed. FIG. 3 shows a diagram (e.g., 300) that illustrates an example of such an iterative optimization process (e.g., which may be implemented by an optimization module).

As shown by FIG. 3, the iterative optimization process may include one or more of the following steps. From a 3D human model 316 (e.g., 3D human model 216 of FIG. 2) generated using the techniques described herein, a set of body keypoints 302 of a person and a normal map 308 associated with a body surface of the person may be inferred from the 3D human model (e.g., consistent with the viewpoint of the sensing device or camera used to generate the 3D human model). A difference 304 between the inferred body keypoints 302 and the originally extracted body keypoints (e.g., body keypoints 206 of FIG. 2) may be calculated. Similarly, a difference 310 between the inferred normal map 308 and the original normal map used to construct the 3D human model may also be calculated. Pose parameters (e.g., θ) 306 and/or shape parameters (e.g., β) 312 may then be adjusted (e.g., by a predetermined amount or step size) based on the calculated differences 304 and 310, and an adjusted (e.g., more optimized) 3D human model 314 may be generated using the adjusted pose parameters 306 and/or the adjusted shape parameters 312. The adjusted 3D human model 314 may then be used as the starting point for a next iteration of optimization.

The optimization process described above may be performed (e.g., subsequent to deployment of the neural networks) over multiple iterations until 3D human model 314 meets certain criteria. The criteria may be considered met, for example, if differences 304 and 310 described above fall under a threshold or if a predetermined number of iterations has been completed. The number of iterations may depend on the initial state of the pose and shape parameters, the amount of adjustment (e.g., step size) made during each iteration, etc. The incremental improvements made over the multiple iterations may result in a 3D human model that more realistically reflects (e.g., better fit) to the pose and shape of the individual person depicted in the input image(s).

The neural networks described herein (e.g., first neural network 204, second neural network 208, and/or third neural network 212 of FIG. 2) may be trained together, for example, in an end-to-end manner, or the neural networks may be trained individually, for example, based on the respective inputs and outputs of the neural networks illustrated by FIG. 2.

Figure 4:
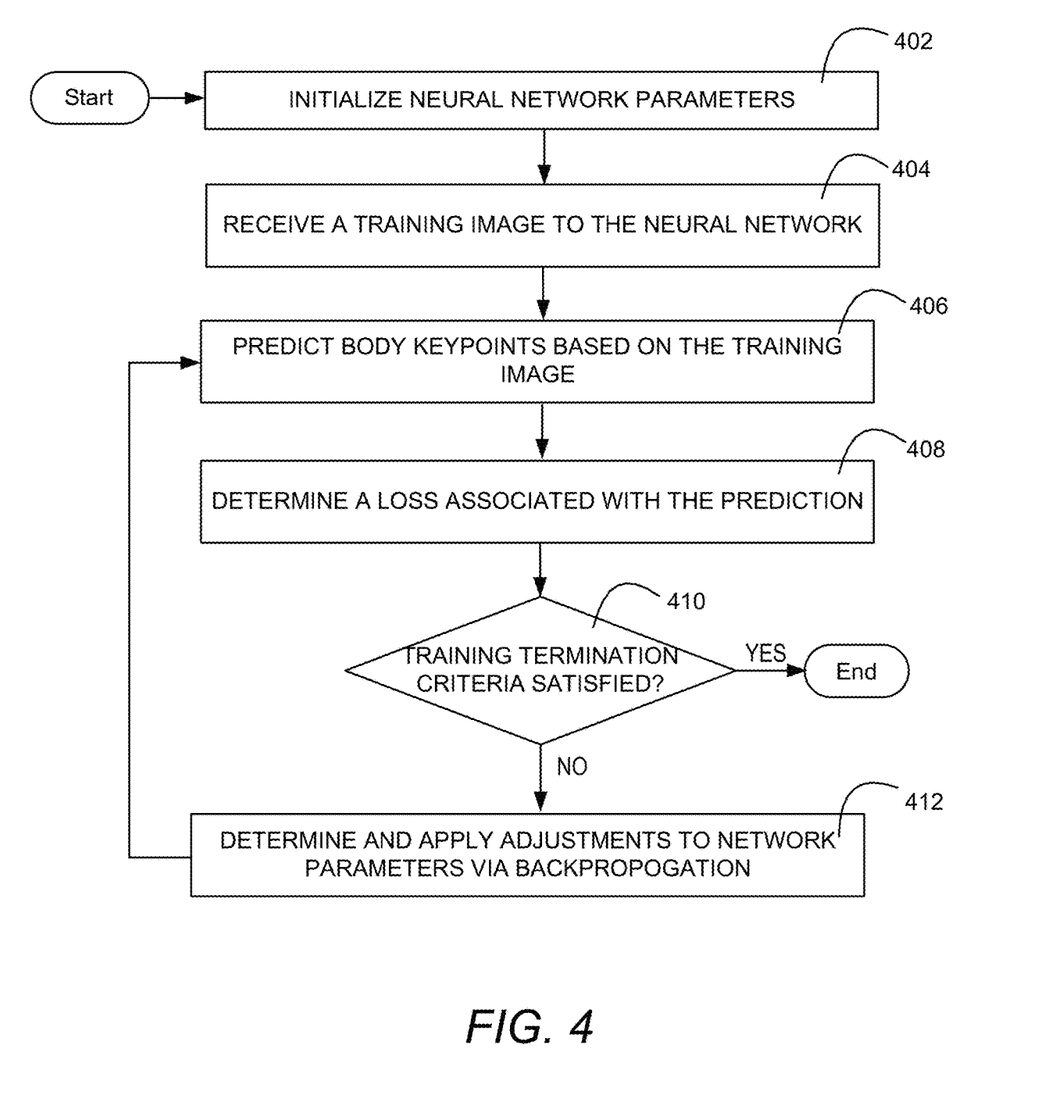
FIG. 4 is a diagram illustrating example operations that may be associated with training a body keypoint detection neural network.

FIG. 4 is a flow diagram illustrating example operations that may be associated with training a body keypoint detection neural network (e.g., first neural network 204 of FIG. 2) using annotated 2D training images (e.g., RGB images). The operations may start with an initialization of network parameters (e.g., weights associated with various layers of the neural network) at 402. For example, the neural network parameters may be initialized by sampling them from one or more probability distributions or based on parameter values of another neural network with a similar architecture. At 404, the body keypoint detection neural network may receive a 2D training image such as an RGB image) as an input, and the body keypoint detection neural network may at 406 extract features from the 2D training image and predict a set of body keypoints based on the extracted features. The body keypoint detection neural network may then (e.g., at 408) compare the predicted body keypoints with annotated body keypoints that correspond to the input 2D training image and determine a loss associated with the prediction. Such a loss may be determined using a suitable loss function such as a loss function configured to calculate the mean squared errors (MSE), L1 norm, L2 norm, etc. between the predicted body keypoints and the annotated body keypoints (e.g., ground truth). At 410, a determination may be made regarding whether one or more training termination criteria are satisfied. For example, the training termination criteria may be satisfied if a pre-determined number of training iterations has been completed, or if the change in the value of the loss between two training iterations falls below a predetermined threshold. If the determination at 410 is that the training termination criteria are not satisfied, the loss determined at 408 may be used at 412 to adjust the parameters (e.g., weights) of the body keypoint detection neural network, for example, by backpropagating the loss (e.g., a gradient descent of the loss) through the neural network. The training may then return to 406. If the determination at 410 is that the training termination criteria are satisfied, the training may end.

Figure 5:
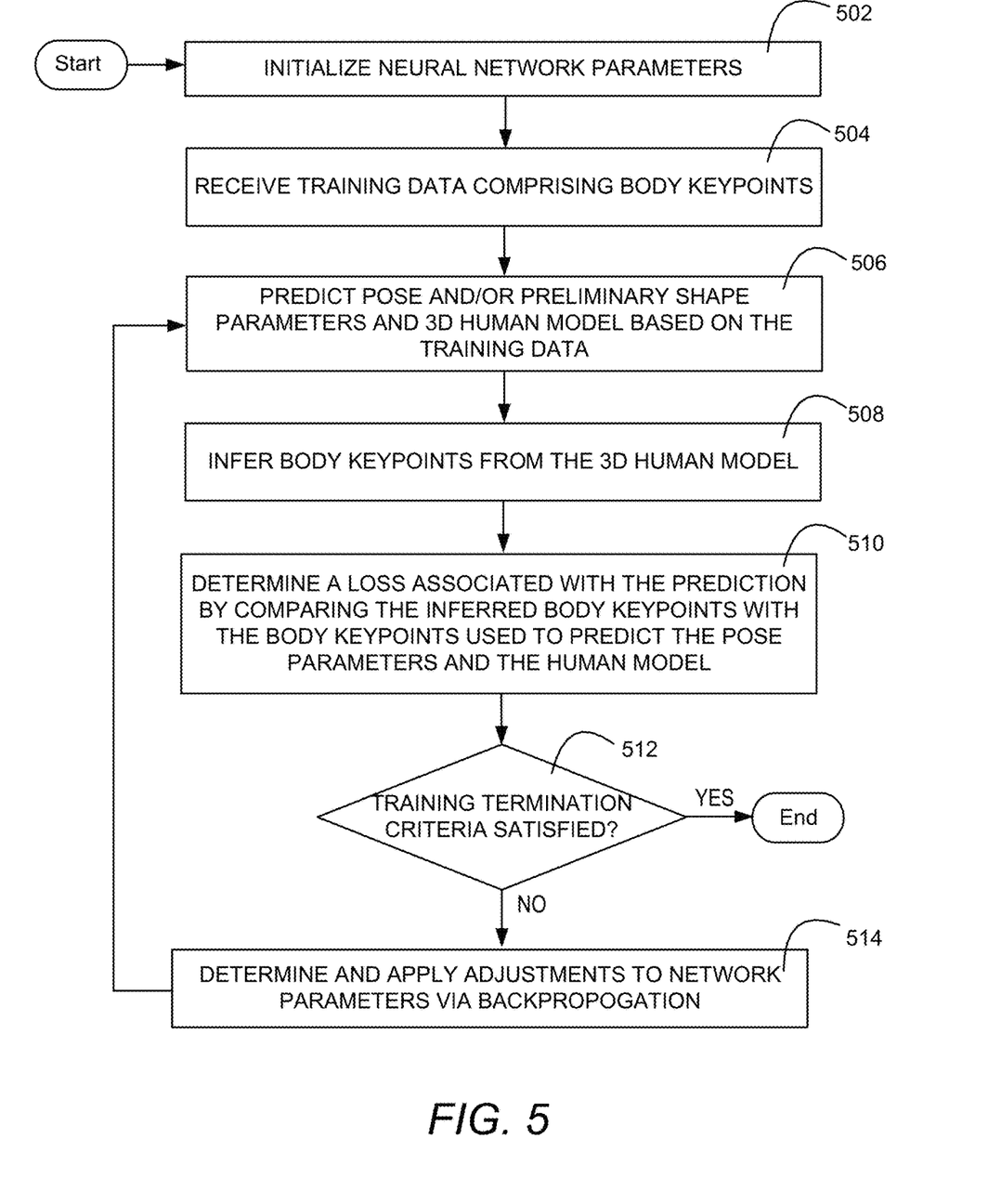
FIG. 5 is a diagram illustrating example operations that may be associated with training a pose regression neural network.

FIG. 5 is a flow diagram illustrating example operations that may be associated with the training of a pose regression neural network (e.g., second neural network 208 of FIG. 2). As shown, the training operations may start at 502 with an initialization of network parameters (e.g., weights associated with various layers of the neural network). The neural network parameters may be initialized, for example, by sampling them from one or more probability distributions or based on parameter values of another neural network with a similar architecture. At 504, the pose regression neural network may receive training data comprising synthetically generated body keypoints. These keypoints may be obtained using various techniques such as via computer simulation, through manual labelling, using a pre-trained body keypoint detection neural network (e.g., such as first neural network 204 of FIG. 2), etc. For instance, a parametric 3D model of a human may be obtained and a plurality of keypoints (e.g., joints) may be defined on the 3D model. The 3D model (together with the defined keypoints) may be used to render (e.g., using a suitable computer graphics engine) digital 3D human bodies with different poses and/or shapes. The keypoints on these digital 3D human bodies may then be projected onto respective 2D images and used as ground truth annotations for training the pose regression neural network.

At 506, the pose regression neural network may predict a plurality of parameters associated with a pose of a person and/or a set of preliminary parameters associated with a shape of the person based on the received body keypoints. The pose regression neural network may further estimate a 3D human model, for example, based on at least the pose parameters and the shape parameters predicted by the pose regression neural network, or based on at least the pose parameters predicted by the pose regression neural network and a set of shape parameters predicted by a shape regression neural network such as third neural network 212 of FIG. 2 (e.g., if the two neural networks are trained together). Subsequently (e.g., at 508), the pose regression neural network may infer a set of body keypoints from the estimated 3D human model and may compare (e.g., at 510) the inferred body keypoints with the body keypoints comprised in the training data to determine a loss associated with the pose parameter prediction and/or model estimation. The loss may be determined, for example, using a suitable loss function such as a loss function based on MSE, L1 normal, L2 norm, etc. between the inferred body keypoints and the body keypoints comprised in the training data. At 512, the pose regression neural network may determine whether one or more training termination criteria are satisfied. For example, the pose regression neural network may determine that the training termination criteria are satisfied if the pose regression neural network has completed a pre-determined number of training iterations, or if changes in the calculated loss between two training iterations have fallen below a predetermined threshold. If the determination at 512 is that the training termination criteria are not satisfied, the pose regression neural network may at 514 adjust its operating parameters (e.g., weights) based on the loss determined at 510, for example, by backpropagating the loss (e.g., a gradient descent of the loss) through the neural network. The training may then return to 506. If the determination at 512 is that the training termination criteria are satisfied, the training may end.

As can be seen from the operations described above, the training of the pose regression neural network (e.g., second neural network 208 of FIG. 2) may be conducted using synthetically generated body keypoints and by causing the neural network to predict at least a set of pose parameters and/or a 3D human model based on the synthetically generated body keypoints. In addition, the performance (e.g., operating parameters) of the neural network may be evaluated and optimized by inferring body keypoints from the predicted 3D human model and forcing the neural network to minimize the difference between the inferred body keypoints and the body keypoints comprised in the training data. Accordingly, the training of the pose regression neural network may be performed in an unsupervised manner and/or without requiring annotated 3D data, thus allowing deep-learning based techniques to be applied to human model recovery.

Figure 6:
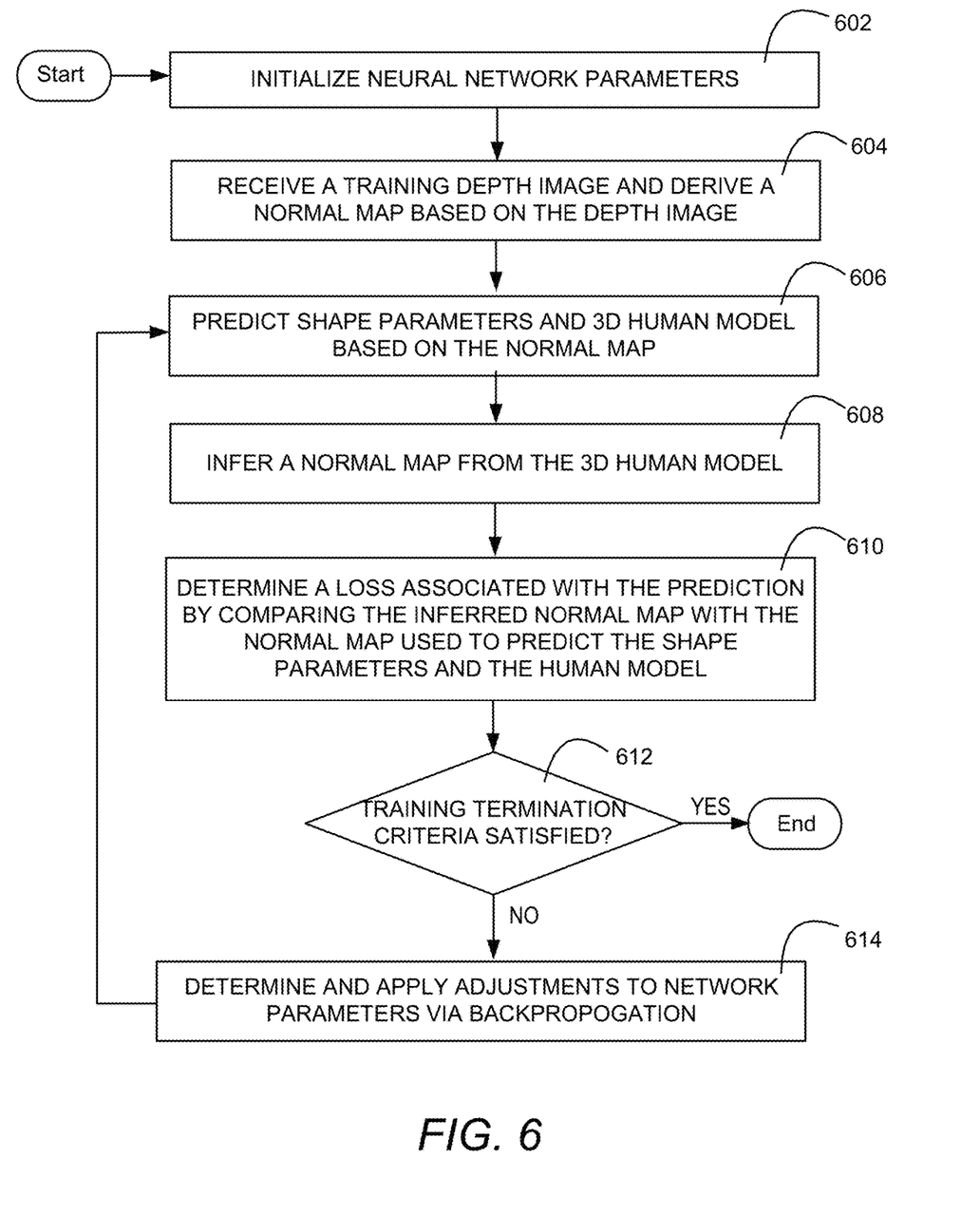
FIG. 6 is a diagram illustrating example operations that may be associated with training a shape regression neural network.

FIG. 6 is a flow diagram illustrating example operations that may be associated with the training of a shape regression neural network (e.g., third neural network 212 of FIG. 2). As shown, the training operations may start at 602 with an initialization of network parameters (e.g., weights associated with various layers of the neural network). The neural network parameters may be initialized, for example, by sampling them from one or more probability distributions or based on parameter values of another neural network with a similar architecture. At 604, the shape regression neural network may receive a depth image of a person and may extract depth information associated with the body surface of the person from the depth image. For example, the shape regression neural network may determine a respective normal vector at each pixel location of the depth image by obtaining the height value associated with the pixel location from the depth image and calculating a vector tangent to the pixel location based on the derivative (e.g., partial derivative) or the rate of change in the height value at the pixel location (e.g., in the X, Y, and Z directions). The shape regression neural network may then generate a normal map corresponding to the depth image based on the respective normal vectors associated with the pixels of the depth image.

At 606, the shape regression neural network may predict a plurality of parameters associated with a shape of the person based on the normal map derived from the input depth image. The shape regression neural network may further estimate a 3D human model based on at least the shape parameters predicted by the shape regression neural network and pose parameters that may be predicted using a pose regression neural network such as second neural network 208 of FIG. 2 (e.g., if the two neural networks are trained together). Subsequently (e.g., at 608), the shape regression neural network may infer a normal map from the estimated 3D human model and may compare (e.g., at 610) the inferred normal map with the normal map determined at 604 to determine a loss associated with the shape parameter prediction and/or model estimation. The loss may be determined, for example, using a suitable loss function such as one based on MSE, L1 normal, L2 norm, etc. between the inferred normal map and the normal map derived at 606. The shape regression neural network may then determine at 612 whether one or more training termination criteria are satisfied. For example, the shape regression neural network may determine that the training termination criteria are satisfied if the shape regression neural network has completed a pre-determined number of training iterations, or if the shape regression neural network determines that changes in the calculated loss between two training iterations have fallen below a predetermined threshold. If the determination at 612 is that the training termination criteria are not satisfied, the shape regression neural network may adjust its operating parameters (e.g., weights) at 614 based on the loss determined at 610, for example, by backpropagating the loss (e.g., a gradient descent of the loss) through the neural network. The training may then return to 606. If the determination at 612 is that the training termination criteria are satisfied, the training may end.

In examples, the training of all or a subset of the neural networks described herein (e.g., first neural network 204, second neural network 208, and/or third neural network 212) may also be combined (e.g., at least partially) to further optimize the parameters of the neural networks. For instance, while training a pose regression neural network (e.g., second neural network 208 of FIG. 2) in accordance with FIG. 5 and a shape regression neural network (e.g., third neural network 212 of FIG. 2) in accordance with FIG. 6, the pose parameters predicted by the pose regression neural network (e.g., at 506) and the shape parameters predicted by the shape regression neural network (e.g., at 606) may be used together to estimate a 3D human model. Then, a set of body keypoints and a normal map may be inferred from the estimated 3D human model and may be compared to respective body keypoints and normal map used to generate the 3D human model to determine respective losses associated with the predictions made by the pose regression neural network and the shape regression neural network. The losses may be determined using a loss function as described herein and may be backpropagated (e.g., individually or as a combined loss such as an average loss) through the neural networks to adjust the respective parameters of the neural networks, for example, with an objective to minimize the difference between the inferred and originally determined body keypoints and/or the difference between the inferred and originally determined normal maps.

For simplicity of explanation, the operations of the system (e.g., system 100 of FIG. 1) are depicted and described herein with a specific order. It should be appreciated, however, that these operations may occur in various orders, concurrently, and/or with other operations not presented or described herein. Furthermore, it should be noted that not all operations that the system is capable of performing are depicted in the figures or described herein. It should also be noted that not all illustrated operations may be required to be performed by the system.

Figure 7:
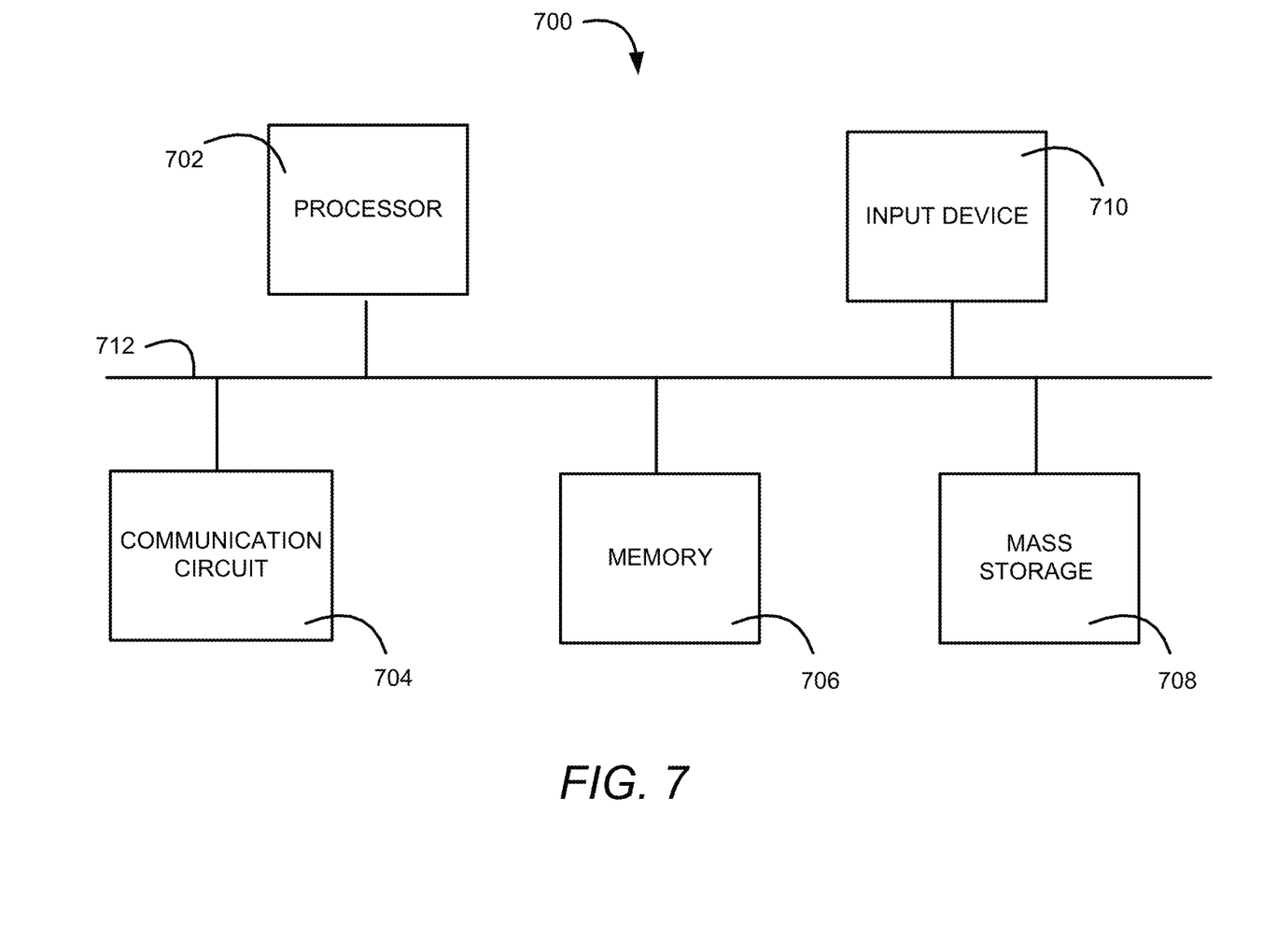
FIG. 7 is a diagram illustrating an example device that may be used to recover a 3D human model.

The systems, methods, and/or instrumentalities described herein may be implemented using one or more processors, one or more storage devices, and/or other suitable accessory devices such as display devices, communication devices, input/output devices, etc. FIG. 7 is a block diagram illustrating an example apparatus 700 that may be configured to recover a human model in accordance with one or more embodiments described herein. As shown, the apparatus 700 may include a processor (e.g., one or more processors) 702, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. The apparatus 700 may further include a communication circuit 704, a memory 706, a mass storage device 708, an input device 710, and/or a communication link 712 (e.g., a communication bus) over which the one or more components shown in the figure may exchange information.

The communication circuit 704 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). The memory 706 may include a storage medium (e.g., a non-transitory storage medium) configured to store machine-readable instructions that, when executed, cause the processor 702 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. The mass storage device 708 may include one or more magnetic disks such as one or more internal hard disks, one or more removable disks, one or more magneto-optical disks, one or more CD-ROM or DVD-ROM disks, etc., on which instructions and/or data may be stored to facilitate the operation of the processor 702. The input device 710 may include a keyboard, a mouse, a voice-controlled input device, a touch sensitive input device (e.g., a touch screen), and/or the like for receiving user inputs to the apparatus 700.

It should be noted that the apparatus 700 may operate as a standalone device or may be connected (e.g., networked or clustered) with other computation devices to perform the functions described herein. And even though only one instance of each component is shown in FIG. 7, a skilled person in the art will understand that the apparatus 700 may include multiple instances of one or more of the components shown in the figure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description.

What is claimed is:

1. An apparatus, comprising:
   one or more processors configured to:
   determine, using a first neural network, body keypoints of a person based on at least a first image of the person;
   determine, using a second neural network, at least a first plurality of parameters associated with a pose of the person based on the body keypoints of the person determined by the first neural network;
   determine, using a third neural network, a second plurality of parameters associated with a shape of the person, wherein the one or more processors are configured to determine a normal map based on a second image of the person and further determine the second plurality of parameters based on the normal map; and
   generate, based on at least the first plurality of parameters and the second plurality of parameters, a three-dimensional (3D) human model that represents at least the pose and the shape of the person.

2. The apparatus of claim 1, wherein the second neural network is trained through a training process that comprises:
   providing a first set of body keypoints to the second neural network;
   causing the second neural network to predict pose parameters based on the first set of body keypoints;
   generating a preliminary 3D human model based on at least the pose parameters predicted by the second neural network;
   inferring a second set of body keypoints from the preliminary 3D human model; and
   adjusting operating parameters of the second neural network based on a difference between the first set of body keypoints and the second set of body keypoints.

3. The apparatus of claim 2, wherein the first set of body keypoints are synthetically generated.

4. The apparatus of claim 1, wherein the second neural network and the third neural network are trained through a training process that comprises:
   predicting, using the second neural network, pose parameters associated with a human body based on a first set of body keypoints associated with the human body;
   predicting, using the third neural network, shape parameters associated with the human body based on a depth image of the human body, wherein a first normal map is derived from the depth image and used to predict the shape parameters;
   generating a preliminary 3D human model based on the pose parameters predicted by the second neural network and the shape parameters predicted by the third neural network;
   inferring a second set of body keypoints and a second normal map based on at least the preliminary 3D human model;
   adjusting operating parameters of the second neural network based on a difference between the first set of body keypoints and the second set of body keypoints; and
   adjusting operating parameters of the third neural network based on a difference between the first normal map and the second normal map.

5. The apparatus of claim 4, wherein the first set of body keypoints are synthetically generated.

6. The apparatus of claim 1, wherein, subsequent to generating the 3D human model based on the first plurality of parameters and the second plurality of parameters, the one or more processors are further configured to optimize the 3D human model by at least:
   inferring a second set of body keypoints and a second normal map from the 3D human model;
   adjusting the first plurality of parameters based on a difference between the second set of body keypoints and the body keypoints determined by the first neural network;
   adjusting the second plurality of parameters based on a difference between the second normal map and the normal map determined based on the second image; and adjusting the 3D human model based on the adjusted first plurality of parameters and the adjusted second plurality of parameters.

7. The apparatus of claim 1, wherein the first image comprises a color image of the person and the second image comprises a depth image of the person.

8. The apparatus of claim 7, further comprising a first sensing device configured to capture the first image of the person and a second sensing device configured to capture the second image of the person.

9. A method for obtaining a three-dimensional (3D) human model, the method comprising:
    determining, using a first neural network, body keypoints of a person based on at least a first image of the person;
    determining, using a second neural network, at least a first plurality of parameters associated with a pose of the person based on the body keypoints of the person determined by the first neural network;
    determining, using a third neural network, a second plurality of parameters associated with a shape of the person, wherein the determination is made by determining a normal map based on a second image of the person and further determining the second plurality of parameters based on the normal map; and
    generating, based on at least the first plurality of parameters and the second plurality of parameters, the 3 D human model, wherein the 3D human model represents at least the pose and the shape of the person.

10. The method of claim 9, wherein the second neural network is trained through a training process that comprises:
    providing a first set of body keypoints to the second neural network;
    causing the second neural network to predict pose parameters based on the first set of body keypoints;
    generating a preliminary 3D human model based on at least the pose parameters predicted by the second neural network;
    inferring a second set of body keypoints from the preliminary 3D human model; and
    adjusting operating parameters of the second neural network based on a difference between the first set of body keypoints and the second set of body keypoints.

11. The method of claim 10, wherein the first set of body keypoints are synthetically generated.

12. The method of claim 9, wherein the second neural network and the third neural network are trained through a training process that comprises:
    predicting, using the second neural network, to predict pose parameters associated with a human body based on a first set of body keypoints associated with the human body;
    predicting, using the third neural network, to predict shape parameters associated with the human body based on a depth image of the human body, wherein a first normal map is derived from the depth image and used to predict the shape parameters;
    generating a preliminary 3D human model based on the pose parameters predicted by the second neural network and the shape parameters predicted by the third neural network;
    inferring a second set of body keypoints and a second normal map based on at least the preliminary 3D human model;
    adjusting operating parameters of the second neural network based on a difference between the first set of body keypoints and the second set of body keypoints; and
    adjusting operating parameters of the third neural network based on a difference between the first normal map and the second normal map.

13. The method of claim 12, wherein the first set of body keypoints are synthetically generated.

14. The method of claim 9, further comprising, subsequent to generating the 3D human model based on the first plurality of parameters and the second plurality of parameters, optimizing the 3D human model by at least:
    inferring a second set of body keypoints and a second normal map from the 3D human model;
    adjusting the first plurality of parameters based on a difference between the second set of body keypoints and the body keypoints determined by the first neural network;
    adjusting the second plurality of parameters based on a difference between the second normal map and the normal map determined based on the second image; and
    adjusting the 3D human model based on the adjusted first plurality of parameters and the adjusted second plurality of parameters.

15. The method of claim 9, wherein the first image comprises a color image of the person and the second image comprises a depth image of the person.

16. The method of claim 15, further comprising capturing the first image of the person using a first sensing device and capturing the second image of the person using a second sensing device.

* * * * *